Patented Dec. 16, 1941

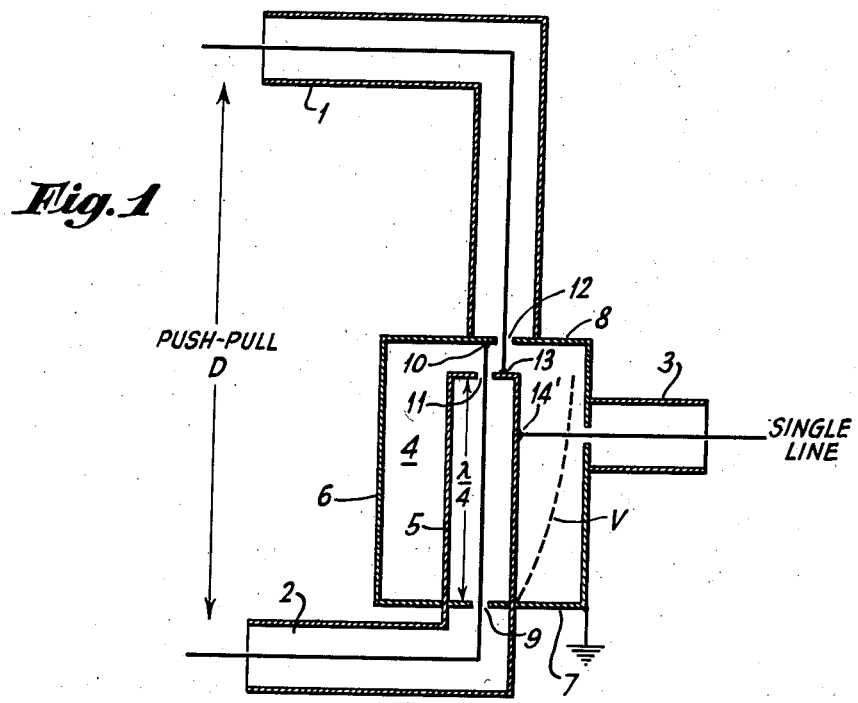
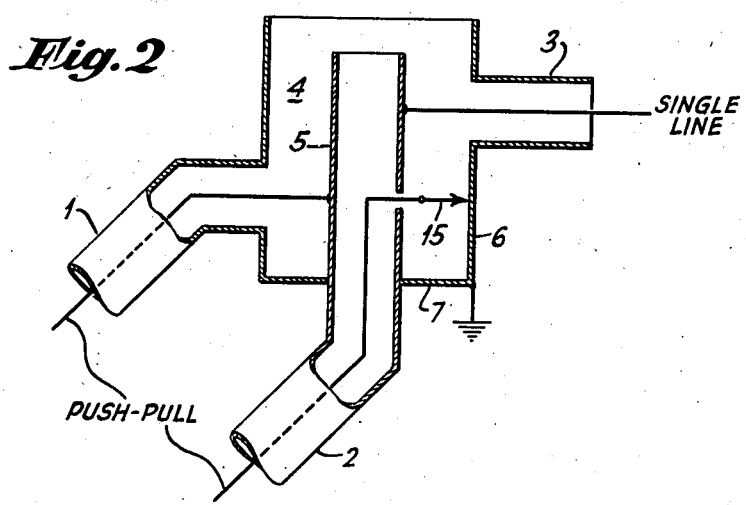

2,266,502

UNITED STATES PATENT OFFICE 2,266,502

COUPLING SYSTEM

Nils E. Lindenblad, Port Jefferson, N. Y., assignor to Radio Corporation of America, a corporation of Delaware Application January 23, 1940, Serial No. 315,159

7 Claims. (Cl. 178—44)

This invention relates generally to a method of and means for coupling a balanced or symmetrical circuit to an unbalanced or single ended circuit, and particularly to an improved high frequency system employing a concentric line resonator, i. e., concentric line tuned oscillatory circuit, as a coupling circuit between a balanced and an unbalanced circuit.

One of the objects of the present invention is to provide a concentric line resonator as a coupling circuit between a balanced circuit and an unbalanced circuit.

Another object is to provide a coupling system by means of which two branches of a balanced or symmetrical circuit, such as a push-pull circuit, can be equally loaded by a resonator of uniformly distributed constants which is fed by an unbalanced or single line circuit.

In brief, the present invention may be said to be based on the appreciation of the fact that in a concentric line resonator having a hollow inner conductor the interior of the inner conductor contains no electromagnetic field resulting from the currents between the inner and outer conductors of the concentric line resonator, and may be considered as being divorced from the concentric line in the same manner as the space exterior to the outer conductor of the concentric line resonator is divorced from the action within the concentric line. Due to the fact that there are opposite instantaneous polarities on the interior surface of the outer conductor and on the exterior surface of the inner conductor and the fact that the interior of the inner conductor and the exterior of the outer conductor have no electromagnetic field, I make use of these conditions in the concentric line resonator to obtain from those surfaces of the inner and outer conductors which face each other potentials of opposite polarities. For deriving these opposite instantaneous polarities, a connection is made from the inner surface of the outer conductor through an aperture in the inner conductor into the interior thereof, and another connection is made from the exterior surface of the inner conductor through an aperture in the outer conductor to the space outside the concentric line.

The concentric line resonator employed in the present invention as a coupling circuit is a type of tuned circuit characterized by low loss and a high Q (low power factor). The inner conductor of the resonator may have a length equal to one-quarter of the operating wave and is coupled at one end in suitable manner to the concentric outer shell. Such a concentric line is described in some detail in the article by Clarence W. Hansell entitled "Resonant Lines for Frequency Control," published in "Electrical Engineering," August, 1935, pages 852 et seq.

A more complete description of the invention follows, accompanied by a drawing wherein Figs. 1 and 2 illustrate two embodiments of the present invention. In the drawing the same or equivalent parts are designated by the same reference numerals throughout the figures.

In Fig. 1 there is shown a balanced or symmetrical circuit having branches 1 and 2, known as a push-pull circuit, which is adapted to have opposite instantaneous polarities thereon, coupled to an unbalanced or single line circuit 3 by means of a concentric resonant line 4. The branches 1, 2 of the push pull circuit, as well as the single line circuit 3, are shown as being coaxial lines, although it will be understood that, if desired, the outer conductors of these circuits may be eliminated. The concentric line resonator 4 is composed of a hollow inner conductor 5 and an outer conductor 6 directly connected together at one end by a metallic end plate 7 which is grounded. The other end of the outer conductor 6 is closed by a metallic plate 8 for completely enclosing the magnetic field of the resonator. The electrical length of the inner conductor 5 of the resonator is one-quarter of a wavelength for the operating frequency, and the voltage distribution on this inner conductor is indicated by the curved dotted line V. The outer conductors of the coaxial lines 1, 2 and 3 are shown connected to the conductor 6 of the resonator and, hence, are also grounded.

The hollow conductor 5 is shown as being a continuation of the outer coaxial conductor of branch 2. The inner conductor of branch 2, or its extension, is arranged to extend within the interior of hollow conductor 5 and to make contact with a point 10 on the plate 8 associated with the outer conductor 6 of the resonator. This inner conductor of branch 2 is insulated from both the end plate 7 and conductor 5 of the resonator by virtue of the apertures or holes 9 and 11. Since the end plate 8 is directly associated with the conductor 6 of the resonator, it will be apparent that point 10 is also directly associated with conductor 6. The inner conductor of branch 1 enters the resonator through an aperture 12 and makes contact with the end of the inner conductor 5 at point 13. Points 12 and 13 are located at the high voltage end of the resonant line, as will be apparent from an inspection of the voltage distribution curve V. Since the inner conductors of the branches 1 and 2 of the balanced circuit are connected with the exterior surface of the conductor 5 and the interior surface of conductor 6, respectively, at points located substantially the same distance away from end plate 9, both branches 1 and 2 encircle substantially the same amount of flux within the resonator and derive equal loading from the resonator. Due to the fact that there is a potential difference between the outer surface of inner conductor 5 and the inner surface of outer conductor 6, there will be produced on the connections to the branches 1 and 2 equal potentials of opposite instantaneous polarities.

The inner conductor of the unbalanced or single line circuit 3 is connected to the inner conductor 5 of the resonator at point 14 which is intermediate the ends of conductor 5. This unbalanced line may, if desired, be used to feed high frequency energy to the resonator, while the balanced circuit 1, 2 receives energy therefrom, or vice versa.

Although the outer conductor 6 of the resonant line has been shown grounded, it should be understood that this ground connection is not strictly necessary since all surfaces exterior to the field of the resonant line are intrinsically at zero radio frequency potential.

In practice, in using the circuit of Fig. 1 the high Q resonant line 4 will not have large circulating currents compared to the lines 1, 2 and 3 connected thereto. The only instance that a large circulating current is required in the resonator compared to the currents in the transmission lines associated therewith is when the impedance of the push-pull lines 1 and 2 do not add up to match the impedance of the single line 3. Ordinarily, as illustrated in Fig. 1, the quarter wave resonator 4 would not carry much circulating current unless the lines connected to its end are of extremely high impedance, which is impractical. In the last assumed condition the quarter wave line would not function very satisfactorily as a transformer unless the push-pull lines 1 and 2 are tapped down from the end.

When all the feeder lines are connected to the end of the quarter wave resonant line 4 (assuming that line 3 is moved up to the free end of the conductor 5) and if lines 1 and 2 in parallel have a surge impedance equal to that of line 3, the circuit becomes a variety of a single line to push-pull converter. The circulating current in the resonator line is then very small.

Fig. 2 illustrates a more representative circuit scheme which may be used in practice and is a modification of the system of Fig. 1. In Fig. 2 the inner conductors of the push-pull lines 1 and 2 are connected to the resonant line 4 at points intermediate its ends, and, if desired, somewhere near the center of the resonator 4. The inner conductor of the single feeder line 3 is connected to the inner conductor 5 of the resonator at a suitable point intermediate its ends. Element 15 is any desired type of movable brush or contact arrangement for connecting line 2 to the inner surface of conductor 6, although it will be evident that this brush can be eliminated and the line 2 directly connected to the conductor 6.

What is claimed is:

1. In combination, a balanced circuit, each side of which comprises a coaxial line, an unbalanced circuit, and a concentric line resonator coupled between said balanced and unbalanced circuits, a connection from the inner conductor of one coaxial line of said balanced circuit to a point on the outer surface of the inner conductor of said resonator, a connection from the inner conductor of the other coaxial line of said balanced circuit to a point on the inner surface of the outer conductor of said resonator which is adjacent said first point, means for connecting said unbalanced circuit to the inner conductor of said resonator at still a third point, said third point being intermediate the ends of the inner conductor of said resonator, said outer conductors of said coaxial lines of said balanced circuit being connected to the exterior surface of the outer conductor of said resonator.

2. A combination in accordance with claim 1, characterized in this that said concentric line resonator is electrically one-quarter of a wavelength long at the operating frequency, said first point of connection being at the high voltage end of said resonator.

3. In combination, a balanced circuit, each side of which comprises a coaxial line, an unbalanced circuit, and a concentric line resonator coupled between said balanced and unbalanced circuits, a connection from the inner conductor of one coaxial line of said balanced circuit to a point on the outer surface of the inner conductor of said resonator, a connection from the inner conductor of the other coaxial line of said balanced circuit to a point on the inner surface of the outer conductor of said resonator, both of said points being substantially the same distance from the low voltage end of said resonator, means for connecting said unbalanced circuit to the inner conductor of said resonator at still a third point where the potential is intermediate the maximum and minimum values, said outer conductors of said coaxial lines of said balanced circuit being connected to the exterior surface of the outer conductor of said resonator and grounded.

4. A system in accordance with claim 1, characterized in this that the inner conductors of said balanced circuit and the conductor of said unbalanced circuit are all connected to suitable point on said resonator intermediate its ends.

5. In combination, a resonant hollow enclosure having a pair of spaced conducting surfaces adapted to have opposite instantaneous polarities thereon, a balanced circuit, an unbalanced circuit, connections from both sides of said balanced circuit to points on said spaced conducting surfaces which are symmetrically located relative to the end of said enclosure, and means coupling said unbalanced circuit to said resonant enclosure at a location intermediate the ends of said resonant enclosure.

6. In combination, a resonant hollow enclosure having a pair of spaced conducting surfaces adapted to have opposite instantaneous polarities thereon, a balanced circuit, an unbalanced circuit, connections from both sides of said balanced circuit to points on said spaced conducting surfaces which are symmetrically located, said points being so chosen that the surge impedance thereat substantially matches that of said balanced circuit, and means coupling said unbalanced circuit to said resonant enclosure in its interior at a location where the potential is intermediate the maximum and minimum values.

7. In combination, a resonant hollow enclosure having a pair of spaced conducting surfaces adapted to have opposite instantaneous polarities thereon, a balanced circuit, an unbalanced circuit, connections from both sides of said balanced circuit to points on said spaced conducting surfaces which are symmetrically located, one of said connections being adjustable over the surface to which it connects, and means coupling said unbalanced circuit to said resonant enclosure.

NILS E. LINDENBLAD.